S. SHAPIRO.
REFRIGERATING COVER FOR MILK CANS.
APPLICATION FILED JULY 8, 1911.
1,020,719.
Patented Mar. 19, 1912.
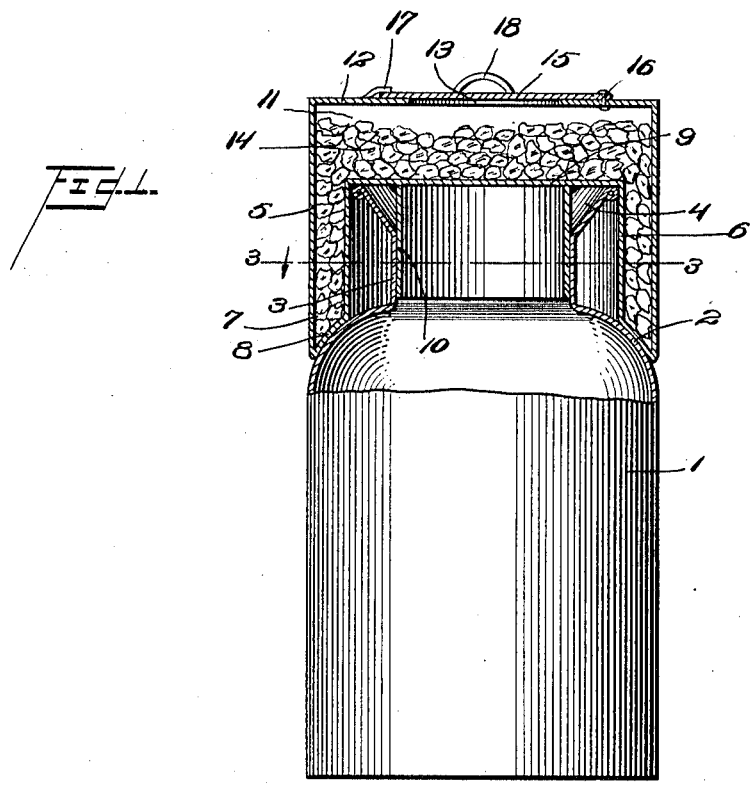
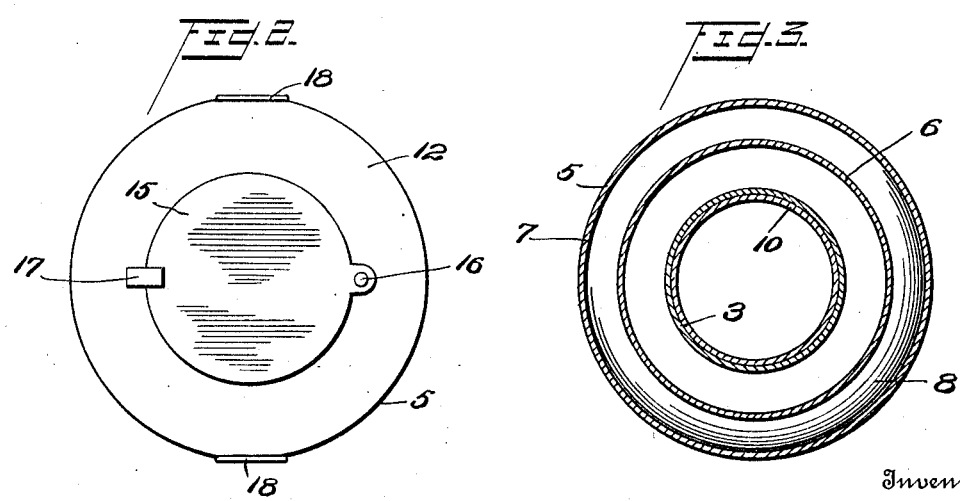
Witnesses
H. Strauss
R. H. Krenkel
Inventor
Samuel Shapiro
By Joshua R. H. Potts
Attorney
COLUMBIA PLANOGRAPH CO., WASHINGTON, D. C.

UNITED STATES PATENT OFFICE.

SAMUEL SHAPIRO, OF PHILADELPHIA, PENNSYLVANIA.

REFRIGERATING-COVER FOR MILK-CANS.

1,020,719.  Specification of Letters Patent.  Patented Mar. 19, 1912.

Application filed July 8, 1911. Serial No. 637,502.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Refrigerating - Covers for Milk - Cans, of which the following is a specification.

My invention relates to improvements in refrigerating covers for milk cans, the object of the invention being to provide a cover which is, in itself, a refrigerator adapted to fit the neck and inclose the neck of a milk can, and is supported on the shoulder or upper end of the body portion of the can, conforming in shape to said portion of the can, whereby a refrigerating chamber is formed around the neck of the can, and the metal of said attachment contacting directly with the metal of the can, insures a rapid interchange of temperatures.

A further object is to provide a cover of this kind which may be used on any ordinary can, which occupies little if any additional space in shipping, and which may be quickly positioned on any can to reduce the temperature of the milk and cream therein, and maintain a low temperature for a considerable length of time. This cover which refrigerates the upper end of the can is based upon the theory that the hottest milk or cream is always at the top, and it is this milk or cream which first sours. By placing the refrigerating cover on the top of the can, the molecules of the milk containing the higher heat units move to the top of the can, and these heat units are absorbed in the refrigerating medium, so that the entire body of the milk and cream within the can is maintained at a low temperature.

With these and other objects in view, the invention consists in certain novel features of construction and combinations and arrangements of parts, as will be more fully herinafter described and pointed out in the claims.

In the accompanying drawings: Figure 1, is a view partly in vertical section and showing my improved cover in position on a can. Fig. 2, is a top plan view of Fig. 1, and Fig. 3, is a view in section on the line 3—3 of Fig. 1.

1, represents an ordinary can having the usual rounded annular shoulder 2 at its upper end communicating with the restricted neck portion 3, having the ordinary flared upper end 4.

My improved refrigerating cover, which is preferably made of sheet metal, comprises an outer wall 5, an inner wall 6 parallel therewith, said walls 5 and 6, being circular and forming an annular ice containing chamber 7, which is closed at its lower end by an inclined bottom 8, conforming in shape to the shape of shoulder 2. The inner wall 6 is appreciably shorter than the outer wall 5, and is made with a top plate 9 which closes the upper end of the can and to this plate 9, a cylindrical extension 10 is provided which fits within the neck of the can. The part 9 also constitutes the bottom of an ice chamber 11, extending throughout the entire diameter of the cover, and communicating with the annular ice chamber 7. This chamber 11 is closed by a top 12 having an opening 13 therein for the reception of ice 14 or other cooling agent. This opening 13 is normally closed by a cover 15 pivotally connected to the top 12 by means of a rivet 16, and held in place by a keeper 17. My improved cover is preferably provided at opposite sides with handles 18 to facilitate its manipulation into position on the can or to remove the same therefrom.

My cover is of approximately the same diameter as the diameter of an ordinary can, so that it does not interfere with the packing of the cans close together. Furthermore, it not only brings the cold metal bottom 8 in direct contact with the shoulder portion 2 of the can, but it provides a refrigerating chamber or compartment around the neck of the can. The temperature of the air in this compartment is reduced to a comparatively low degree, and the heat units in the milk are rapidly removed. The cover can be readily taken off the can when it is desired to pour out the milk, and can be easily and quickly placed in position when desired.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what

I claim as new and desire to secure by Letters Patent is:

1. A cover of the character described, comprising inner and outer walls parallel with each other, the inner wall shorter than the outer wall, a plate connecting the upper edge of the inner wall, a cylindrical extension on said plate adapted to project into and snugly fit the neck of a can, an inclined bottom connecting the lower edges of the inner and the outer walls, a top plate connecting the upper edge of the outer wall and having an opening therein, and a cover normally closing said opening, substantially as described.

2. A cover of the character described, comprising inner and outer walls parallel with each other, the inner wall shorter than the outer wall, a plate connecting the upper edge of the inner wall, a cylindrical extension on said plate adapted to project into the neck of the can, an inclined bottom connecting the lower edges of the inner and the outer walls, a top plate connecting the upper edges of the outer wall and having an opening therein, a cover normally closing said opening, said cover of a diameter approximately the same as the diameter of the milk can, and said inner wall constituting a chamber of greater diameter than the diameter of an ordinary milk can neck, whereby a refrigerating compartment is formed around said neck, substantially as described.

In testimony whereof I have signed my name to this specification in the presence of two subscribing witnesses.

SAMUEL SHAPIRO.

Witnesses:
R. H. KRENKEL,
CHARLES E. POTTS.

---

Copies of this patent may be obtained for five cents each, by addressing the "Commissioner of Patents, Washington, D. C."